(12) United States Patent
Hurling

(10) Patent No.: US 8,052,425 B2
(45) Date of Patent: Nov. 8, 2011

(54) IMPLICIT ATTITUDE TRAINER

(75) Inventor: Robert Hurling, Bedford (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1159 days.

(21) Appl. No.: 11/787,694

(22) Filed: Apr. 17, 2007

(65) Prior Publication Data

US 2008/0261186 A1    Oct. 23, 2008

(51) Int. Cl.
*G09B 19/00* (2006.01)
(52) U.S. Cl. .................. 434/236; 434/350
(58) Field of Classification Search ............ 434/236
See application file for complete search history.

(56) References Cited

U.S. PATENT DOCUMENTS

| | | | | |
|---|---|---|---|---|
| 5,456,607 A | * | 10/1995 | Antoniak | 434/323 |
| 2004/0063081 A1 | * | 4/2004 | Lipkins | 434/236 |
| 2005/0079474 A1 | * | 4/2005 | Lowe | 434/236 |
| 2005/0250082 A1 | * | 11/2005 | Baldwin et al. | 434/236 |
| 2006/0287991 A1 | * | 12/2006 | Greenwald et al. | 707/3 |
| 2007/0117072 A1 | * | 5/2007 | Adjali et al. | 434/236 |

* cited by examiner

*Primary Examiner* — Xuan Thai
*Assistant Examiner* — Jerry-Daryl Fletcher
(74) *Attorney, Agent, or Firm* — Michael P. Aronson

(57) ABSTRACT

An automated method and computer interface for stimulating a user to develop and/or alter their implicit attitudes towards behavioral objects, such as dieting, alcohol consumption or exercising etc. The method comprising presenting a series of stimuli to the user within a test environment, each stimulus being associated with a behavioral object. The test environment may be a computer display screen, wherein the method designates a first zone within the environment as a positive behavioral association region and designates a second zone within the environment as a negative behavioral association region. The method further prompting the user to categorize each stimulus by moving the stimulus to either the first zone or the second zone, wherein positively categorizing stimuli causes the user to develop improved implicit attitudes towards the behavioral objects associated with those stimuli in the first zone. The invention is particularly suited for implementation within web-browser and desktop environments.

13 Claims, 3 Drawing Sheets

IMPLICIT ATTITUDE TRAINER

The present invention relates to behavioural training and interactive techniques, and in particular relates to cognitive methods and interfaces for developing and altering a user's implicit attitudes towards behavioural objects.

It is known that human attitudes towards performing a particular behaviour or activity, such as exercising regularly, maintaining a healthy diet or studying for exams, are dependent upon the positive and negative sub-conscious associations that an individual has towards those behavioural objects. These underlying sub-conscious associations are intimately related to the individual's implicit attitudes, which may be thought of as automatically activated judgements that occur upon encountering the behavioural objects. These attitudes are to be differentiated from the individual's 'explicit attitudes', which are judgements made at a conscious level, possibly following some degree of rational consideration or deliberation.

Hence, an individual's behaviour is generally governed by how strong their implicit attitudes are towards particular objects and/or activities, such that an advertisement for a hamburger may cause an individual who has a positive implicit attitude towards fast-food, to bypass the gym and go for a cheese-burger instead. Conversely, in another example, a student may have a negative implicit attitude towards mathematics and therefore may forego completing extra-curricular work to the detriment of his studies.

Recent research suggests that whether or not an individual can alter their behaviour depends upon the relative strengths of their implicit attitudes. For example, if an individual's implicit attitude towards eating fruit is more positive than their implicit attitude towards the competing behaviour of eating sweet treats (e.g. cakes and biscuits), then the likelihood of performing the desired behaviour of eating fruit is duly increased. Consequently, such individuals are more likely to engage in corresponding target behaviours, such as eating healthily and/or exercising etc.

For those individuals who have implicit attitudes towards desired behaviours that are less positive than their implicit attitudes towards competing behaviours, will be less inclined to engage in target behaviours. In such situations a conflict can arise between the individual's implicit and explicit attitudes, which reduces the likelihood that an identified goal (e.g. to lose weight) will lead to a corresponding target behaviour (e.g. jogging).

The emergence of a conflict between implicit and explicit attitudes is problematic to an individual, as generally this may prevent them from undertaking activities to achieve their target goal or goals.

Implicit and explicit attitudes and goal conflicts can all be assessed in laboratory environments and using dedicated Internet-based algorithms. However, although such assessments are instructive and indicative of an individual's attitude towards particular behavioural objects they do not generally offer any form of training to develop and/or alter an individual's implicit attitudes. Therefore, such algorithms are not generally useful for promoting stronger associations between an individual's attitudes and behavioural objects.

Moreover, many of the known techniques focus primarily on an individual's explicit attitudes and consequently provide incomplete assistance towards changing the individual's behaviour. Therefore, such techniques do not generally offer any improvement in an individual's lifestyle, health and/or self-confidence, for instance.

Hence, in accordance with the present invention an automated training method is provided for interacting with an individual to develop and/or alter his/her implicit attitudes towards behavioural objects. By associating objects with the individual's own self image, it is found that a more positive sub-conscious association is achieved between the individual and the target behavioural object. This promotes improved implicit attitudes towards the object which in turn can increase the likelihood a desired target behaviour will be enacted notwithstanding the impact of the individual's explicit attitude towards that same behaviour.

An object of the present invention is to provide an automated method for training an individual to develop and/or alter their implicit attitudes towards behavioural objects.

Another object of the present invention is to provide a method that sub-consciously reinforces an individual's behavioural associations to objects by requiring the individual to perform physical actions in response to a series of stimuli.

Another object of the present invention is to provide a training environment that stimulates an individual to develop improved implicit attitudes for creating positive changes in their behaviour.

Some or all of the above objects may be achieved by one or more embodiments of the invention.

According to an aspect of the present invention there is provided an automated method for stimulating a user to develop and/or alter their implicit attitudes towards behavioural objects, comprising:

presenting a series of stimuli to the user within a test environment, each stimulus being associated with a behavioural object;

designating a first zone within the environment as a positive behavioural association region and designating a second zone within the environment as a negative behavioural association region; and prompting the user to categorise each stimulus by moving the stimulus to either the first zone or the second zone, wherein positively categorising stimuli causes the user to develop improved implicit attitudes towards the behavioural objects associated with those stimuli in the first zone.

According to another aspect of the present invention there is provided a computer interface for stimulating a user to develop and/or alter their implicit attitudes towards behavioural objects, comprising:

means for presenting a series of stimuli to the user within a test environment, each stimulus being associated with a behavioural object;

means for designating a first zone within the environment as a positive behavioural association region and designating a second zone within the environment as a negative behavioural association region; and means for prompting the user to categorise each stimulus by moving the stimulus to either the first zone or the second zone, wherein positively categorising stimuli causes the user to develop improved implicit attitudes towards the behavioural objects associated with those stimuli in the first zone.

Embodiments of the present invention will now be described in detail by way of example and with reference to the accompanying drawings in which.

Figure 1:
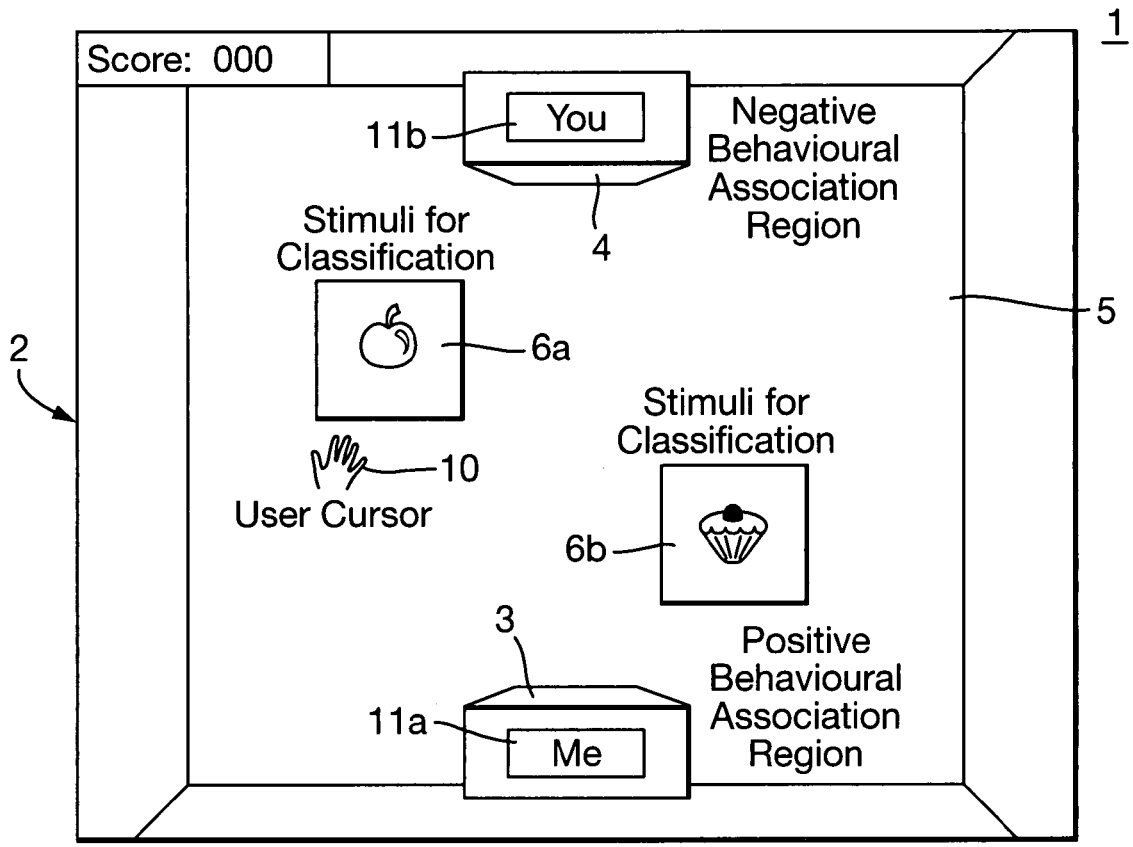
FIG. 1 is a screen shot of a particularly preferred arrangement of a computer game environment according to the invention.

With reference to FIG. 1, there is shown a particularly preferred implementation of the method of the present invention. The method is most preferably implemented as a computer interface operating within a computing environment. Suitable computing environments include desktop personal computers, mobile computing devices, such as personal digital assistants (PDAs), mobile phones and laptop computers, and web-browser applications. Although any other computing environments and architectures may alternatively be used in accordance with the present invention.

In exemplary arrangements, the computer interface is implemented via software as a client application. The client application may be a standalone application (e.g. .EXE) running within the operating system environment or else may be an applet (e.g. Java) running within a web-browsing environment (e.g. Firefox, Netscape Navigator or Internet Explorer etc.).

Alternatively in other arrangements, the computer interface may be in the form of both software and hardware, such that at least some components of the computer interface exist in the electronic circuitry of the host computing environment.

In most preferred arrangements, it is intended that the client application will be installed within the computing environment by remotely accessing a suitable software repository (located on a remote server or other suitable server database), and then downloading the client application. Alternatively, the client application may be directly installed within the computing environment by transfer from a suitable media (e.g. CD-Rom, DVD, Compact Flash, Secure Digital card etc.).

In accordance with the present invention, the client application is operable to provide training exercises to a user, preferably in the form of one or more computer games (see example in FIG. 1). The training exercises are designed to stimulate the user to develop and/or alter their implicit attitudes towards behavioural objects, such as eating healthily, taking exercise and studying for exams etc. The training exercises involve presenting a series of stimuli to the user, such that each stimulus is associated with a behavioural object, and requiring the user to quickly categorise the stimuli according to whether they have a positive association or negative association with that object. In categorising the stimuli, the user is required to perform a physical action, which reinforces the user's positive or negative associations with the corresponding objects.

In this way, the training exercises lead the user to develop stronger positive implicit attitudes towards those objects that they like and stronger negative implicit attitudes towards those objects that they do not like. Such an effect can be particularly advantageous in applications where the user is attempting to strengthen their association with a target activity, e.g. dieting or exercising etc., as the present invention can promote a more positive attitude towards the activity thereby increasing the likelihood that the user will attain the corresponding goal, e.g. weight loss or healthier lifestyle etc.

By 'physical action' we mean any recognisable physiological response of the user's body, including any physical movement of the body (e.g. limbs, head etc.) as well as all physiological indicators, such as heart rate, perspiration level and pupil dilation etc. or any combination thereof.

The training exercises can take many different forms, but they all share the same underlying principle of stimulating the user to respond quickly to a number of objects. In other words, the exercises are designed to test the user's instinctive responses to stimuli so as to cognitively probe and develop their implicit attitudes towards the associated behavioural objects.

In the preferred computer game based arrangements, the training exercises can correspond to different standalone games, or different levels within the same game etc. and are preferably selected by the user via a menu driven screen layout. In this way, the user can select which game or level that they wish to play, thereby enabling the user to customise the order of their training exercises. In some arrangements however, it could be that only certain games, or levels of the game, can be accessed after preceding levels have been completed etc. Of course, the structure of the game, number of levels and degree of customisation etc. will depend on the particular application.

References herein to 'stimuli' or 'stimulus' are to be taken to include any visual object such as symbols, graphics, pictures, words, phrases or slogans etc., or any combination thereof. Each stimulus is selected to convey an association with a corresponding behavioural object, such that a user will associate the stimulus with a particular behaviour or activity. For example, a picture of an apple could be selected to convey a healthy diet, whereas a picture of a cream cake could be used to convey a poor or unhealthy diet (see example in FIG. 1).

In a computer game arrangement, pictures or graphics are preferred for use as stimuli as the user will generally react more quickly to a picture stimulus than the corresponding descriptive word for that stimulus, e.g. a user will react to a picture of an apple more quickly than to the word 'APPLE' etc. Hence, in the preferred arrangements of the computer game, stimuli are presented to the user as pictures or graphical representations.

Of course, it is to be appreciated that any suitable form of stimulus may be used according to the principles of the present invention, provided that the stimulus is able to trigger a clear association with a behaviour or activity in the mind of the user.

Referring to FIG. 1, there is shown an exemplary arrangement of a training exercise according to the present invention implemented as a computer game 1. The computer game 1 executes within the host computing environment (hereinafter referred to as the 'host computer') and is displayed via an associated display device (see FIGS. 2 and 3), such as a display screen 12 (e.g. TFT, CRT monitor etc.). The computer game 1 defines a test environment 2 in which to stimulate and train the user 7. In computer game arrangements, the test environment 2 preferably corresponds to either the display screen 12 of the host computer or else a conventional graphics window within the display screen 12 of the host computer.

According to the method of the present invention, a first zone 3 is designated within the test environment 2 as a positive behavioural association region (hereinafter referred to as the 'positive region'); while a second zone 4 is designated within the test environment 2 as a negative behavioural association region (hereinafter referred to as the 'negative region'). The purpose of these regions is to establish respective areas into which stimuli 6a, 6b may be categorised by the user 7 (as discussed below), such that the positive region 3 is to be associated with behavioural objects for which positive reinforcement of the user's implicit attitude is desired, and the negative region 4 is to be associated with behavioural objects for which negative reinforcement of the user's implicit attitude is desired.

In preferred computer game arrangements, the positive and negative regions 3, 4 are represented or rendered as respective 'containers', e.g. box-like structures or baskets, in either 2D or 3D (i.e. perspectively rendered). However, it is to be appreciated that any suitable graphical object, image or geometrical shape may be used to represent the regions 3, 4.

Alternatively, the positive and negative regions 3, 4 may not be represented by any particular object or structure, and instead may simply correspond to different portions of the screen or graphics window, e.g. lower third and upper third, respectively etc.

Referring again to FIG. 1, the positive and negative regions 3, 4 are shown in this arrangement as perspectively rendered boxes defined within a bounded room or enclosure 5. Preferably, the positive region 3 is located within the test environment 2 so that it appears closer to the user 7 than the negative region 4. By 'closer' we mean that the positive region 3 is located at, or near to, the bottom of the screen or graphics window, with the negative region 4 at, or near, the top, or that the game environment is rendered in 3D so that an artificial depth is achieved whereby the negative region 4 appears further away than (i.e. behind) the positive region 3.

In the arrangement of FIG. 1, the positive region 3 is located at the bottom of the enclosure 5 and the negative region 4 is at the top, thereby promoting the illusion that the positive region 3 is closer to the user 7.

It has been found that in arranging the positive and negative regions 3, 4 in the manner described above, more positive reinforcement is achieved as the act of bringing stimuli 6a, 6b closer to the user 7 (either physically or perceptively) appears to play a part in strengthening the user's implicit attitudes towards an object (this is discussed in further detail below).

According to the method of the present invention, a series of stimuli are presented to the user 7, which in the example of FIG. 1, preferably appear as a series of pictures or images 6a, 6b which may enter from any side of the enclosure 5, or else appear (e.g. visually materialise) at a random location within enclosure 5. Of course, any combination of pictures or words may be used, as consistent with the definition of stimuli above.

In FIG. 1, for ease of understanding, two stimuli 6a, 6b are shown in the middle area of enclosure 5. In preferred arrangements, the stimuli 6a, 6b enter from the left hand side of the enclosure 5, at a random or fixed vertical displacement from the bottom left hand corner of the enclosure 5. The stimuli 6a, 6b are presented to the user 7 at a frequency or rate which promotes the user 7 to quickly (and instinctively) respond to the stimuli 6a, 6b, so that the user 7 categorises the stimuli 6a, 6b according to their implicit attitudes towards the associated behavioural objects.

The stimuli 6a, 6b preferably move from left to right across the enclosure 5, but may also move at random within the enclosure 5, according to a statistical random walk etc. However, any particular stimulus will only be displayed for a relatively short interval of time, preferably up to about 1 second, to mitigate against the user 7 spending too long deliberating over their response to the stimulus. In this way, the extent to which the user 7 rationally considers the categorisation of the particular stimulus is minimised, which thereby promotes a more instinctive, and attitude driven, response to the stimulus.

In practice, it is likely that a user's responses to the stimuli are still consciously controlled, even when responding in under a second of time, but by using only a short response interval ensures that the user 7 must react quickly, thereby developing instinctive associations with the objects, without giving the user 7 too much time to think about the objects in detail.

The frequency of the stimuli and time for which they are displayed to the user 7 can be varied depending on the particular application and implementation. However, to ensure effective benefits of the training the method should be implemented so that the user 7 responds quickly to the stimuli 6a, 6b.

In the example of FIG. 1, the computer game has been set up to reinforce the user's attitudes towards a healthy diet and healthy lifestyle. Therefore, the stimuli 6a, 6b respectively correspond to behavioural objects representative of healthy food, e.g. an apple 6a, and unhealthy food, e.g. a cream cake 6b. Of course any other suitable food related objects, or weight related images (e.g. a picture of an obese person etc.) and/or words (e.g. "FAT", "SLIM" etc.) could be used according to the preferred arrangement.

Figure 2:
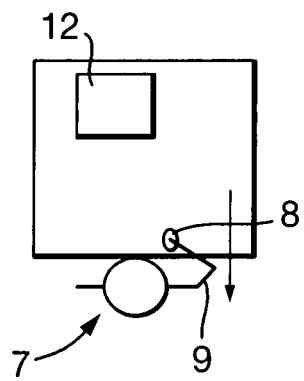
FIGS. 2 & 3 are schematic representations of a user performing physical actions according to preferred principles of the invention.
Figure 3:
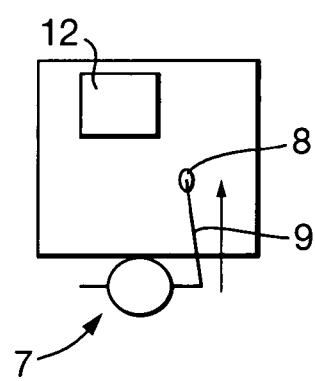

In preferred arrangements, as shown in FIGS. 2 and 3, before commencing each game a calibration phase is performed by the user 7 which calibrates the movement of an input device 8 with the movement of a stimulus 6a, 6b within the enclosure 5. The input device 8 is preferably a conventional, wired or wireless, computer mouse which is used to control the movement of the stimuli 6a, 6b within the enclosure 5 by way of a cursor 10 or other graphical element controlled by the user 7.

In order to calibrate the mouse, the user 7 is preferably instructed to pull or draw the mouse towards himself/herself, across the surface of their work area (e.g. workstation desk etc.), as close as possible to his/her body, as shown by the arrow in FIG. 2. This manipulation of the input device 8, leads the user 7 to perform a physical action that draws in their arm 9, towards their body, and brings the mouse physically closer to the user 7.

The computer game is arranged to calibrate the measured displacement of the mouse (i.e. range of movement towards the user 7) to the corresponding distance between the positive and negative regions 3, 4 in the enclosure 5. In this way, any movement of the mouse towards the user 7, will cause the cursor 10 to move towards the positive region 3 in the enclosure 5 by a calibrated amount.

As shown in FIG. 3, a second stage of the calibration requires the user 7 to perform the reverse action to that of the above, such that the user 7 is instructed to push the mouse away from their body and extend their arm 9 to substantially full extent. Again, this movement is then calibrated with the movement of the cursor 10 in the enclosure 5, so that any movement of the mouse way from the user 7 will cause the cursor 10 to move towards the negative region 4 in the enclosure 5 by a corresponding calibrated amount.

Of course the extent to which the user 7 can draw in and extend their arm 9 will depend largely on the size of their work area, desk or work station etc. However, the purpose of the calibration is to promote the user 7 to perform a physical action, in this case, closing and extending their arm 9, which has been found to further reinforce the positive and negative associations the user 7 has with associated behavioural objects. It seems that in performing the physical act of drawing in an object that is positively associated with a user 7, the user's 7 implicit attitude towards that object is further enhanced, presumably as a consequence of a human's natural tendency or innate drive to bring desirable objects and/or beneficial items towards themselves, whereas objects which are associated with undesirable and/or dangerous objects are instinctively moved or pushed away from them. In this latter case, the physical act of moving the object away from the user 7 has been found to further enhance the user's negative implicit attitude towards that object.

Hence, it is to be appreciated that, within the framework of the computer game arrangements, the act of physically drawing in or rejecting objects can be simulated by manipulating the input device 8, so that moving it backwards and forwards, by reversible extension of the user's arm 9, causes a stimulus on screen to be moved towards either the positive or negative region 3, 4 respectively.

It is to be appreciated that any suitable input device 8 can be used instead of a computer mouse to control the movement of the stimuli 6a, 6b within the enclosure 5. However, not all input devices will require the same degree of manual manipulation as a mouse, nor will they involve the user 7 having to reversibly extend their arm 9 to control the cursor 10 (e.g. trackball or keypad devices etc.). Obviously in these cases, the calibration phase may not be needed at all, or else will comprise a different procedure (e.g. such as defining up/down key clicks etc.). However, all such devices remain consistent with the present invention, as it has been found that some, if not all, of the benefits of the invention are still available without manual operation of a computer mouse.

Of course, it remains preferred in exemplary arrangements to use a mouse so that the user 7 experiences further reinforcement of their positive implicit attitudes by virtue of the physical action of reversibly extending their arm 9.

It is to be appreciated that in mobile computing implementations of the computer interface of the present invention, the input device 8 may correspond to the device's keypad (e.g. as on a mobile phone) or touch sensitive pad (e.g. as on a laptop etc.). In such arrangements, the movement of the stimuli can be controlled by suitable key or screen presses etc. according to the particular application.

In preferred arrangements, prior to or following on from the calibration phase, the user 7 may be asked whether they would like to personalise either the positive region 3 or negative region 4 of the enclosure 5. Options available for personalising the regions include: (i) supplying pictures or graphical representations, which may be uploaded to the host computer from an attached media (e.g. hard disk, CD-ROM, digital camera memory stick etc.) and/or (ii) editing a respective textual field 11a, 11b. The textual fields 11a, 11b may be areas within or close to each region 3, 4 which allow the user 7 to insert characters, letters, words or phrases etc. into the fields, as shown in FIG. 1.

Preferably, the user 7 is encouraged to identify himself/herself with the positive region 3 by either attaching a picture of himself/herself to the region, or by inserting their real name, initials or nickname etc. into the respective textual field 11a, or alternatively to do both. Additionally, the user 7 may also assign a negatively associated picture or name to the negative region 4, such as a picture of an obese person or the name of someone or something they dislike.

In this way it has been found that their implicit attitudes towards behavioural objects are further improved when they positively associate an object with their own self-image and negatively associate an object with something they dislike. Hence, for example, if the user 7 positively the picture of the apple 6a with himself/herself then it is generally found that the user 7 has an improved implicit attitude towards choosing a healthier diet. The reason behind this seems to be that most individuals have a relatively positive self-image, which if it is repeatedly associated with desirable objects, further strengthens the positive association with those objects. Hence, in pairing or matching self-related references (e.g. pictures of the user, the user's name, nickname etc.) with a displayed stimulus, the user's positive implicit attitudes are improved towards the associated behavioural object. Advantageously therefore, the user 7 is likely to have much stronger goal shielding abilities concerning the activity related to the object, as a consequence of the improved implicit attitudes.

In preferred arrangements, should the user 7 not wish to personalise the positive and negative regions 3, 4, the computer game can adopt default textual field entries, such as "Me" and "You" for the positive and negative regions 3, 4 respectively. These default entries are shown in FIG. 1.

Alternatively, the positive and negative regions 3, 4 can be left blank (i.e. no picture or textual entry) while still achieving some, if not all, of the benefits of the present invention. In other arrangements, the textual entries could default to category labels that are related to the training exercise, such as "FRUIT" and "CAKES" or "SLIM" and "FAT" etc. depending on the particular application.

Figure 4A:
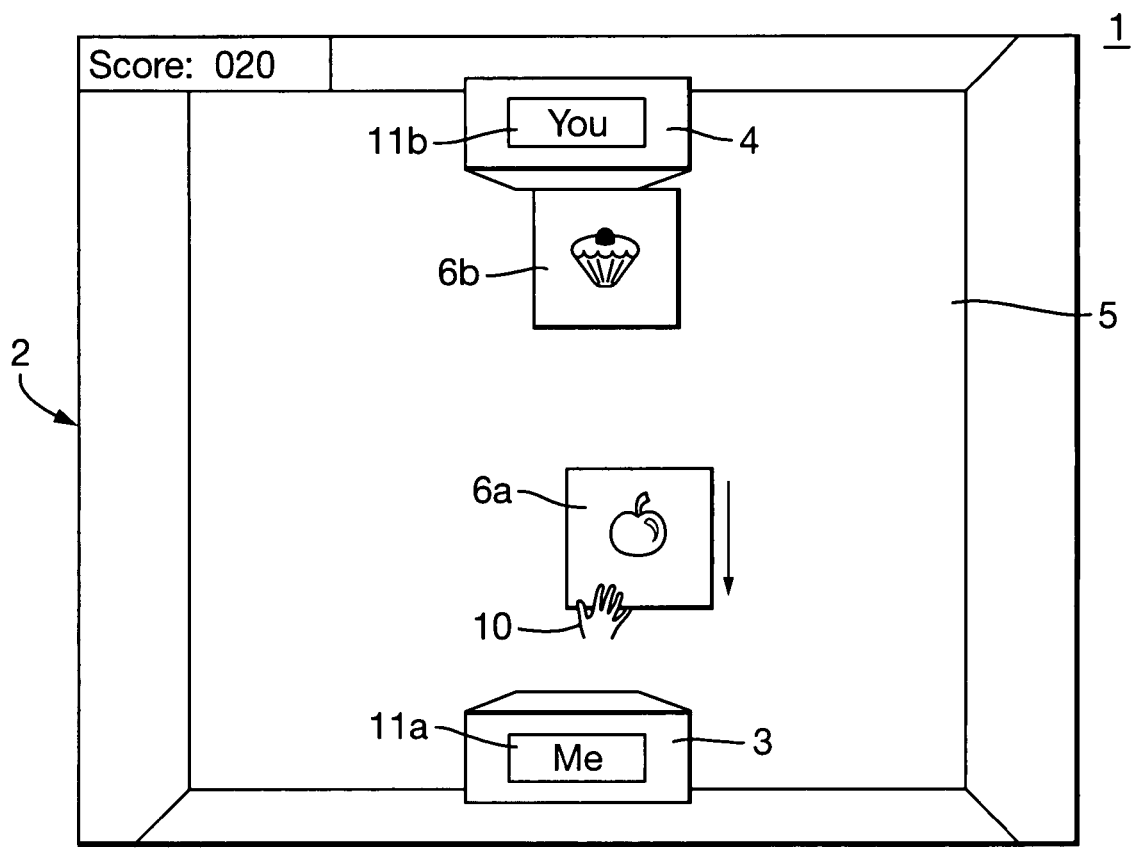
FIG. 4(a) is another screen shot of the computer game environment of FIG. 1, showing an example of positive categorisation.
Figure 4B:
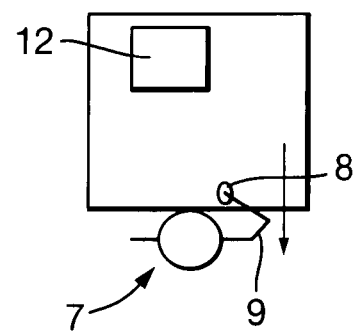
FIG. 4(b) is a schematic representation of a user performing a physical action corresponding to the positive categorisation of FIG. 4(a).
Figure 5A:
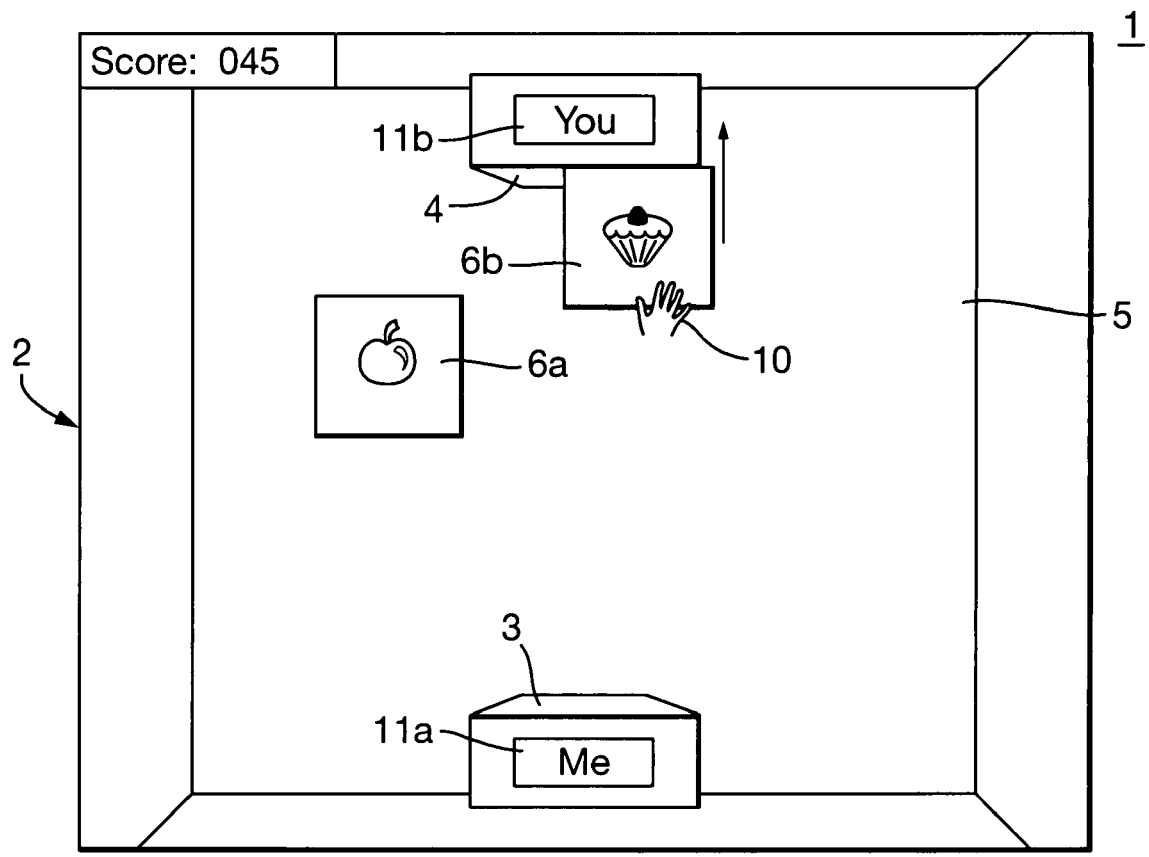
FIG. 5(a) is another screen shot of the computer game environment of FIG. 1, showing an example of negative categorisation.

Referring to FIGS. 4(a), 4(b) and FIGS. 5(a), (b), there are shown further illustrations of the exemplary computer game arrangement as described in relation to FIG. 1 above.

At the start of the computer game, following the calibration phase and optional personalisation stage, the user 7 is instructed to categorise the stimuli 6a, 6b by selecting each stimulus and moving it to either the positive or negative regions 3, 4 before the stimulus disappears from the enclosure 5. (This may be achieved by allowing the stimulus to exit from any side of the enclosure 5 or else by visually dematerialising the picture or image etc.)

To select a stimulus, the user 7 preferably 'grabs' the corresponding picture or image by way of the cursor 10 (e.g. by a single click action etc. on input device 8) and then 'drags' it to either one of the positive or negative regions 3, 4 within the enclosure 5. In FIG. 4(a), the user 7 has responded to the stimulus corresponding to the picture of the apple 6a and has grabbed the picture via cursor 10. The user 7 obviously has a positive association with eating healthily and has instinctively responded to the picture of the apple and associated this with a healthy diet. The user 7 positively categorises the stimulus 6a by moving it to the positive region 3, whereupon the picture of the apple preferably disappears (to simulate the object falling into the box or basket etc.). As shown in FIG. 4(b), this procedure is accomplished by the user 7 manipulating the mouse 8 by drawing it in towards himself/herself, thereby positively reinforcing the user's implicit attitude towards the healthy food by virtue of performing the physical action of pulling in his/her arm 9. Consequently, it is found that the user 7 has an improved positive implicit attitude towards choosing a healthy diet and as a result is more likely to better shield their goal of eating healthily.

Figure 5B:
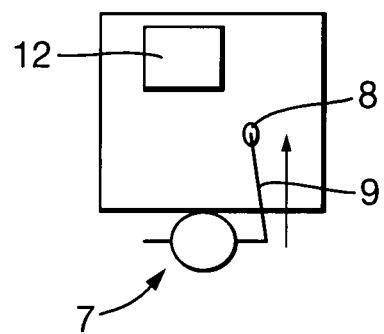
FIG. 5(b) is a schematic representation of a user performing a physical action corresponding to the negative categorisation of FIG. 4(a).

In FIG. 5(a), the same user 7 has responded to the stimulus corresponding to the picture of the cream cake 6b and has grabbed the picture via cursor 10. The user 7 has a positive association with eating healthily and has instinctively responded to the picture of the cream cake as being an object that is undesirable. The user 7 negatively categorises the stimulus 6b by moving it to the negative region 4, whereupon the picture of the cream cake preferably disappears (as explained above). As shown in FIG. 5(b), this procedure is accomplished by the user 7 manipulating the mouse 8 by pushing it away from himself/herself, thereby positively reinforcing the user's implicit attitude towards eating healthily by rejecting the cream cake 6b and performing the physical action of extending his/her arm 9. Consequently, it is found that the user 7 has an improved implicit attitude towards refusing unhealthy food, such as cream cakes, and is therefore more likely to better shield their goal of eating healthily.

The computer game preferably continues until all the stimuli in the series for this training exercise have been categorised. It is expected that each series will include around 30-100 stimuli, and most preferably about 50 stimuli. Of course, any number of stimuli and any number of series may be used in accordance with the method of the present invention.

Preferably, a numerical scoring algorithm maintains an ongoing score during each training exercise, to provide feedback to the user 7 as to their responses. Any suitable scoring model may be used, but it is preferred that the user 7 receives a positive numerical value when they accept objects that are desirable from the point of view of the training exercise and also when they reject objects which are undesirable from the point of view of the exercise. For example, in a dieting based training exercise, the user 7 would receive 20 points for positively categorising an apple and would receive 25 points for negatively categorising a cream cake. However, 15 points would be deducted if an apple is negatively categorised and 30 points would be deducted if a cream cake is positively categorised.

In other arrangements, the user 7 may instead, or in addition, receive rewards for good performance and progress through the training exercises, so as to further motivate them to develop their implicit attitudes. For example, the user 7 could be rewarded with pictures and/or pleasant sounds etc. in recognition of their performance and test scores. Of course, any suitable scoring and/or reward based system could be used consistent with the method of the present invention.

After completing several of the training exercises, the user 7 will be expected to have improved their implicit attitudes towards the behavioural objects categorised during the computer games, so that their positive associations with the objects are significantly strengthened and reinforced, thereby potentially leading to enhanced self-confidence and goal attaining ability.

A number of modifications may be made to the computer game arrangements and implementation of the training exercises, consistent with the present invention.

For instance, the game environment could be rendered in a 3D setting having apparent depth, so that the negative region 4 could appear to be further away from the positive region 3 (as mentioned earlier). However, in addition, the stimuli 6a, 6b could be made to vary in apparent size as they are moved towards or away from the positive region 3. In other words, the stimuli 6a, 6b would get bigger and smaller as they are moved through the apparent depth of the 3D setting. It is believed that this feature would further enhance the positive or negative association with an object, as it provides an extra degree of realism to the movement of the objects. Any suitable game engine could be used to render the images within the 3D setting, as known in conventional gaming technology.

It is also possible that at specific points during categorisation or thereafter, the user 7 could be presented with one or more questions related to their previous responses. The questions may prompt the user 7 to consider their feelings about the behavioural objects and/or consider why they have accepted one object over another. In this way, by considering their feelings or preferences about a particular object it is found that their explicit attitude towards that object is activated. Therefore, the computer game may also assess whether the user 7 has any conflict between their implicit and explicit attitudes for that object. As a result, the computer game can provide an assessment of the user's goal conflicts based on the apparent differences between their attitudes, which can be subsequently used to modify the training exercises to alleviate any such conflicts.

It is to be appreciated that any of the training exercises may be modified by the user 7 and/or by the computer game itself, so as to optimise the training for the user depending on the particular application and implementation. In this respect, the user 7 is able to select which training exercises to perform and/or the topics of each categorisation test. Hence, for example, if the user 7 is particularly interested in eating healthily, they can choose one or more diet related exercises. If the computer game is arranged to automatically optimise the training, which is preferred in most cases, it can then assess whether any goal conflicts exist between the user's attitudes towards particular foods (e.g. apples, creams cakes etc.) and then take steps to strengthen or weaken the user's association with those foods. Hence, for example, if the game discovers that the user 7 is accepting cream cakes over apples during a diet training exercise, it can then adjust the scoring model accordingly to punish the user 7 and/or pose additional questions asking the user 7 to consider why they are rejecting the healthier option etc.

According to another aspect of the present invention which is consistent with all arrangements of the invention, the computer interface may also be associated with one or more biometric sensors. The expression 'associated with' is intended to encompass physically connected to or wirelessly connected to, by wireless protocols (e.g. Bluetooth, WiFi) etc.

The one or more biometric sensors may include a skin chemical/conductance monitoring sensor, a heart rate monitoring sensor or a user imaging device (e.g. CMOS or CCD camera). The use of biometric sensors provides an opportunity to also monitor the user's physiological reaction to the stimuli 6a, 6b and therefore provides further means to assess the user's instinctive responses to the behavioural objects in the game.

It is to be appreciated that any suitable sensor or sensor type may be used in accordance with the present invention. In particular, remote physical monitors, such as accelerometers, may also be used to measure and determine any spontaneous and/or required physical activity of the user 7 that may arise due to one or more of the stimuli 6a, 6b.

The sensors are able to monitor the user's instinctive responses to the presented stimuli, since for example, skin conductance, heart rate and eye movement etc. can all change rapidly in response to certain visual stimuli. Hence, in accordance with the present invention, the computer interface may receive real-time data relating to the user's physiological indicators, e.g. heart rate, pupil dilation etc., which may then be used in conjunction with their responses to determine whether the user's implicit attitudes are consistent with their explicit attitudes (as derived from the questioning process as discussed above).

In some arrangements, a biometric sensor may be used as the input device 8, instead of a computer mouse etc. Therefore, for example, a virtual reality headset or similar device could be used to monitor the user's eye movement, such that the headset could be configured to allow the user 7 to move the stimuli 6a, 6b within the enclosure 5 by movement of their eyes. Hence, the user 7 could look at a stimulus on screen and 'drag' the stimulus to either the positive or negative region 3, 4 by looking at the respective box or basket etc. The movement of the user's eyes would be monitored by imaging cameras (e.g. CCDs) within the headset as is conventionally known in the art.

It is also possible that voice activated techniques could also be used in some of the training exercises, such that the stimuli 6a, 6b are categorised by verbal instructions. It is expected that some, if not all, of the benefits of the present invention are still available to the user 7 when using verbal reinforcement to strengthen the user's attitudes towards the behavioural objects. In these applications the computer interface would require an audio input device (e.g. microphone) as known in the art.

Although the present invention is ideal for training and improving a user's implicit attitudes towards behavioural objects via use of an automated method and computer interface, it will be recognised that one or more of the principles of the invention could be used in other applications, for instance, in any computer-based training scenario in which it is beneficial to create a positive association between a user and a behavioural object or characteristic.

Other embodiments are taken to be within the scope of the accompanying claims.

The invention claimed is:

1. An automated method for developing and/or altering a user's implicit attitudes towards behavioural objects, said method implemented on a computing device via software as a client application that provides a training exercise selected by the user to strengthen their associations with a target behavior or activity, said training exercise comprising:
   presenting a series of stimuli to the user within a test environment which is either a display screen of a computing device or a graphics window within a display screen of a computing device, each stimulus being associated with a behavioural object, said behavioral object associated with the particular behavior or activity, wherein the series of stimuli are presented at a frequency which promotes the user to categorise the stimuli at a level which minimises rational consideration of the stimuli;
   designating a first zone within the environment as a positive behavioural association region associated with the user's self image and designating a second zone within the environment as a negative behavioural association region associated with something or someone the user dislikes; and
   prompting the user to categorise each stimulus by moving the stimulus to either the first zone or the second zone,
   wherein positively categorising stimuli causes the user to develop improved implicit attitudes towards the behavioural objects associated with those stimuli in the first zone thereby increasing the likelihood a target behavior or activity will be enacted.

2. The automated method as claim in claim 1, wherein the first and second zones correspond to respective graphical regions defined within the test environment.

3. The automated method as claimed in claim 1, wherein moving the stimulus requires the user to perform a physical action which reinforces their association with that stimulus.

4. The automated method as claimed in claim 3, wherein the physical action manipulates an input device which controls the movement of the stimulus within the test environment.

5. The automated method as claimed in claim 4, wherein the user manipulates the input device by bringing it physically closer to the user to positively categorise the stimulus, and moving it physically away from the user to negatively categorise the stimulus.

6. The automated method as claimed in claim 4, further comprising a calibration phase which calibrates the movement of the input device with the movement of the stimulus within the test environment.

7. The automated method as claimed in claim 1, further comprising prompting the user with questions corresponding to respective stimuli during categorisation to additionally determine their explicit attitudes towards the behavioural objects associated with those stimuli.

8. The automated method as claimed in claim 7, further comprising assessing whether the user has any conflicts between their explicit and implicit attitudes towards one or more of the behavioural objects associated with the stimuli.

9. The automated method as claimed in claim 1, wherein the series of stimuli comprises a plurality of words and/or images.

10. The automated method as claimed in claim 1, further comprising associating the first zone with a graphical representation or image of the user, and/or references pertaining to the user.

11. The automated method as claimed in claim 1, wherein the first zone is perspectively rendered so as to appear relatively closer to the user than the second zone.

12. A computer interface for developing and/or altering a user's implicit attitudes towards behavioural objects, said computer interface implemented on a computing device as a client application via software that provides a training exercise selected by the user to strengthen their associations with a target behavior or activity said interface comprising:
   a display screen for presenting a series of stimuli to the user within a test environment which corresponds to either the display screen or a graphics window within the display screen, each stimulus being associated with a behavioural object, said behavioral object associated with the particular behavior or activity, wherein the series of stimuli are presented at a frequency which promotes the user to categorise the stimuli at a level which minimises rational consideration of the stimuli;
   means for designating a first zone within the environment as a positive behavioural association region associated with the user's self image and designating a second zone within the environment as a negative behavioural association region associated with something or someone the user dislikes; and
   means for prompting the user to categorise each stimulus by moving the stimulus to either the first zone or the second zone,
   wherein positively categorising stimuli causes the user to develop improved implicit attitudes towards the behavioural objects associated with those stimuli in the first zone thereby increasing the likelihood the target behavior or activity will be enacted.

13. The automated method as claimed in claim 1 wherein the user is asked to identify himself/herself with the first zone by either attaching a picture of himself/herself to the region, or by inserting the user's real name, initials or nickname and to also assign a negatively associated picture or name to the second zone.

* * * * *